United States Patent
Endter

[19]

[11] Patent Number: 5,619,884
[45] Date of Patent: Apr. 15, 1997

[54] AUTOMATIC FORMING MACHINE

[75] Inventor: Horst Endter, Langenfeld, Germany

[73] Assignee: Eumuco-Hasenclever GmbH, Leverkusen, Germany

[21] Appl. No.: 351,379

[22] PCT Filed: Jun. 1, 1993

[86] PCT No.: PCT/DE93/00480

§ 371 Date: Feb. 24, 1995

§ 102(e) Date: Feb. 24, 1995

[87] PCT Pub. No.: WO93/25330

PCT Pub. Date: Dec. 23, 1993

[30] Foreign Application Priority Data

Jun. 10, 1992 [DE] Germany ............................ 42 18 955.1
Nov. 10, 1992 [DE] Germany ............................ 42 37 898.2

[51] Int. Cl.[6] ........................................................ B21J 9/18
[52] U.S. Cl. ............................................. 72/449; 74/52
[58] Field of Search ................................ 74/52; 72/449

[56] References Cited

U.S. PATENT DOCUMENTS 2,316,114   4/1943   Thompson ................................. 74/52
2,506,133   5/1950   Browne ..................................... 74/52
3,508,451   4/1970   Yoshida .
3,848,472  11/1974   Pim .
4,047,441   9/1977   Kellogg ..................................... 74/52
4,137,797   2/1979   Brems ....................................... 74/52
4,223,568   9/1980   Brems ....................................... 74/52
4,697,466  10/1987   Sugawara et al. .

FOREIGN PATENT DOCUMENTS 914211   10/1946   France .
2061043   6/1972   Germany .
303354    2/1955   Switzerland .

*Primary Examiner*—David Jones
*Attorney, Agent, or Firm*—Jacobson, Price, Holman & Stern, PLLC

[57] ABSTRACT

An automatic forming machine for hot forging workpieces conveyed step by step through the forging area has a driven eccentric shaft upon which is mounted a connecting rod linked to an up-and-down movable tool carriage. By associating an irregular drive mechanism with the eccentric shaft, the automatic forming machine allows continuous operation even in the case of hot forging

2 Claims, 5 Drawing Sheets

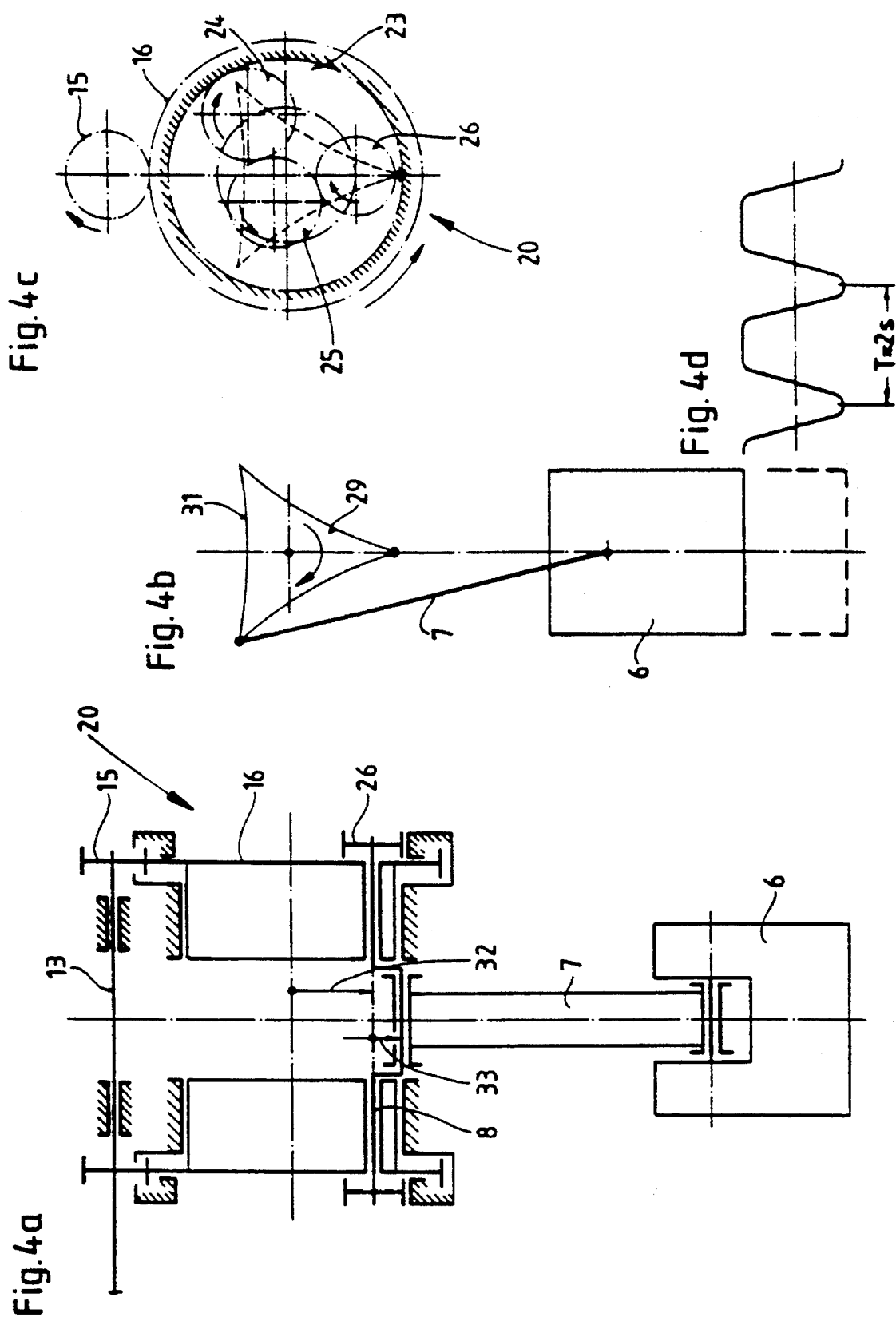

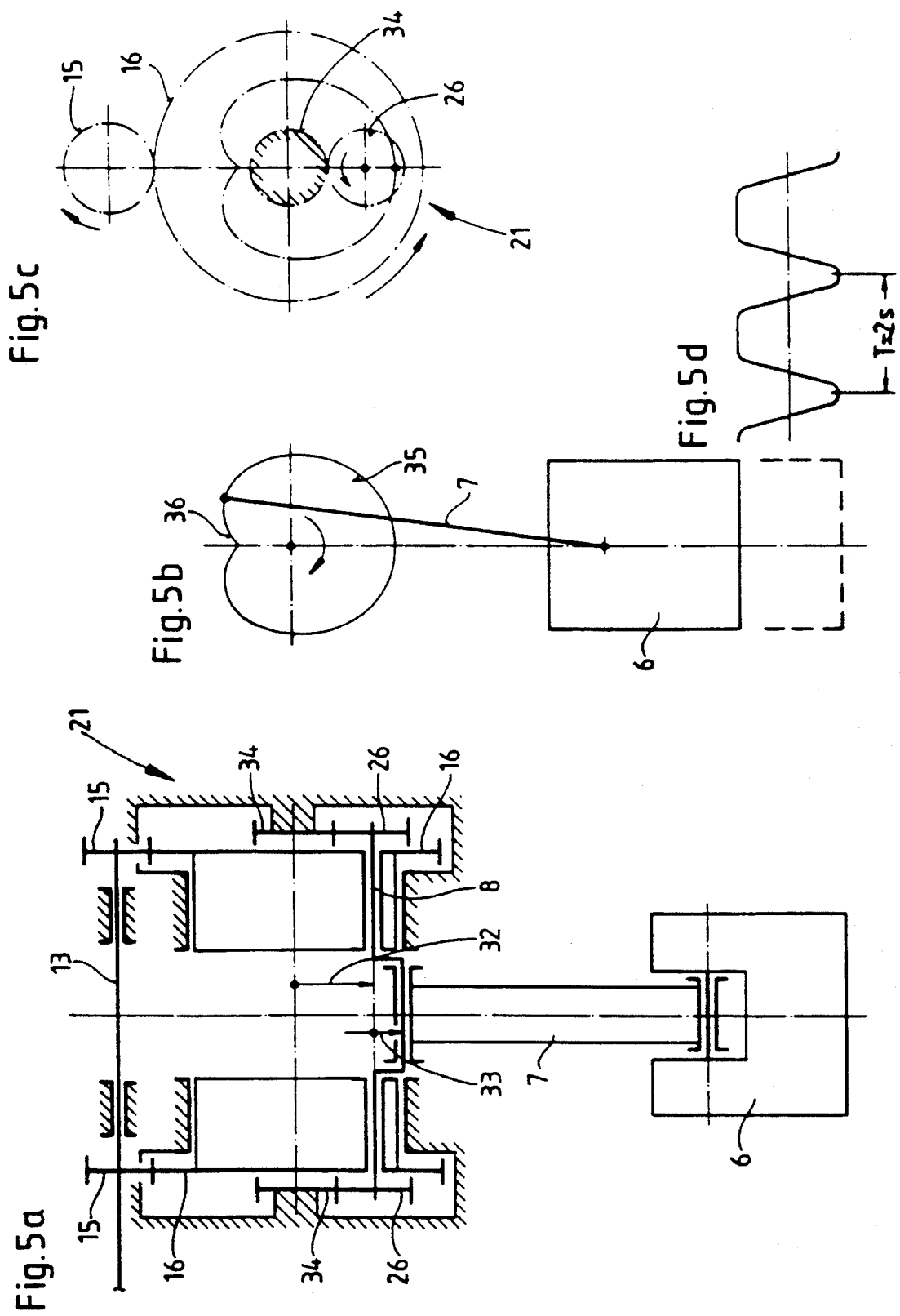

AUTOMATIC FORMING MACHINE

BACKGROUND OF THE INVENTION

The invention relates to an automatic forming machine, in particular an eccentric forging or crank press, for hot forging workpieces which are conveyed stepwise through a forging region, having a driven eccentric shaft on which there is mounted a connecting rod connected to the tool carriage, which can be moved up and down and with which there is associated an irregular drive having a stationary, internally toothed hollow gear meshing with a planet pinion gear.

DE-AS 2 061 043 discloses a die forging press (eccentric press, wedge press or the like) having automatic workpiece transport, in which walking beams and an automatic drive associated therewith are provided for transporting the workpiece from die to die. The walking beams receive the workpiece between them and are provided with suitable gear systems which enable raising and lowering, closing and opening and longitudinal movement of the walking beams.

The result is that the maximum production rates per unit of time depend on the minimum cycle time, which in the case of a fully automatic forming machine is generally determined by the time for transporting the forged pieces from one die to the next. In addition to transporting the forged pieces, during this time the following functions (handling) also take place: press stroke up and down, discharge of the forged pieces by mechanical dischargers above and below, cleaning, cooling and application of lubricant to the dies. In the case of cold and semi-hot metal forming of the forged pieces, the press stroke is slowed down to the extent necessary for the transporting time. Thus, speeds (cycle time) of 20 to 30 rpm can be used there without disadvantages for the forged pieces. In contrast, such speeds are not possible with hot forging, since in the event of excessively low speeds the die contact times become too high, with the consequence of an abruptly reduced service life of the dies. For this reason, with hot forging in practice eccentric forging presses are operated—depending on the size of the press—at speeds between 50 and 70 rpm. However, this means that taking into account the required cycle times continuous operation is not possible and in general even fully automatic forming machines (eccentric forging or crank press) have to be used in switched operation. This necessitates, after each revolution of the eccentric shaft, coupling and deceleration. In automatic operation with walking beam systems, minimum cycle times of approximately 2.5 to 3.5 seconds are then possible.

SUMMARY OF THE INVENTION

The object of the invention is thus to provide an automatic forming machine in particular an eccentric forging and crank press of the type mentioned at the outset in which an irregular drive enables the build-up of the high force required for operating the press and which enables continuous operation even with hot forging.

According to the invention, this object is achieved in that there is associated with the eccentric shaft an irregular drive. Because of the irregular drive, it is possible to provide a slow-running eccentric or crank press having the die contact time of a fast-running press which is therefore suitable for continuous operation with an automated stroke system. This is because a pushrod which is stationary in its top position can be achieved so that more time is available for the automated walking beam system and the other secondary activities (handling) which have to be carried out.

For this reason, it is proposed that the irregular drive be constructed as a planet gear system having a stroke rest position of the tool carriage at the top reversal point. Because the tool carriage has no more travel to cover at the top reversal point, while a high speed is reached in the region of the bottom reversal point, coupling and deceleration on each press stroke can be dispensed with. Rather, this is only still necessary on switching the forging press on and off.

In accordance with a preferred embodiment, the planet gear system has a stationary, internally toothed hollow gear meshing with a planet pinion gear which is in geared connection by way of an intermediate gear with a pinion mounted on the eccentric shaft. In contrast to a conventional eccentric press, wherein the curve of movement is a circle performing the carriage stroke by way of the connecting rod, the planet gear system of the present invention achieves a kinematic curve of movement sequence in the form of a hypocycloid wherein the curve of movement is a triangle whereof the tip points downwards, that is to say towards the bottom reversal point. The tool carriage, driven by way of the connecting rod, in this case remains at the top reversal point in a rest position for a relatively long time although the eccentric shaft continues to move, that is to say the main drive continues to run at constant speed. The hypocycloid in the form of a triangular curve is produced in this case if the transmission ratio is 3:1. Because of the triangular curve possible as a result of the planet gear system, the same forming speeds or die contact times can be achieved with a forging press running at half the speed as with a fast running forging press. The form of the triangular curve can be varied with the ratio of the eccentrics to one another in such a way that preferably the tool carriage has the fastest speed at the bottom reversal point. The more acute the downward tapering of the triangular curve, the faster the forming speed.

Thus, if the speed of the eccentric shaft is three times as high as the stroke rate of the tool carriage, by comparison with a conventional forging press, a die contact time which is just as short can be achieved with half the stroke rate of the tool carriage.

Further features and advantages of the invention will emerge from the claims and the description which follows, in which some embodiments of the subject of the invention are explained in more detail with reference to an eccentric press.

BRIEF DESCRIPTION OF THE DRAWINGS

FIGS. 4a to 4d show symbolic illustrations of the irregular drive according to FIG. 1, which comprises a planet gear system having an internally toothed hollow gear, a triangular curve of the movement sequence, achieved therewith, and a distance/time graph; and FIGS. 5a to 5d show symbolic illustrations of another embodiment of an irregular drive having a stationary pinion on the housing, a curve of movement achieved with the gear system and a distance/time graph.

DESCRIPTION OF THE PREFERRED EMBODIMENTS

Figure 1:
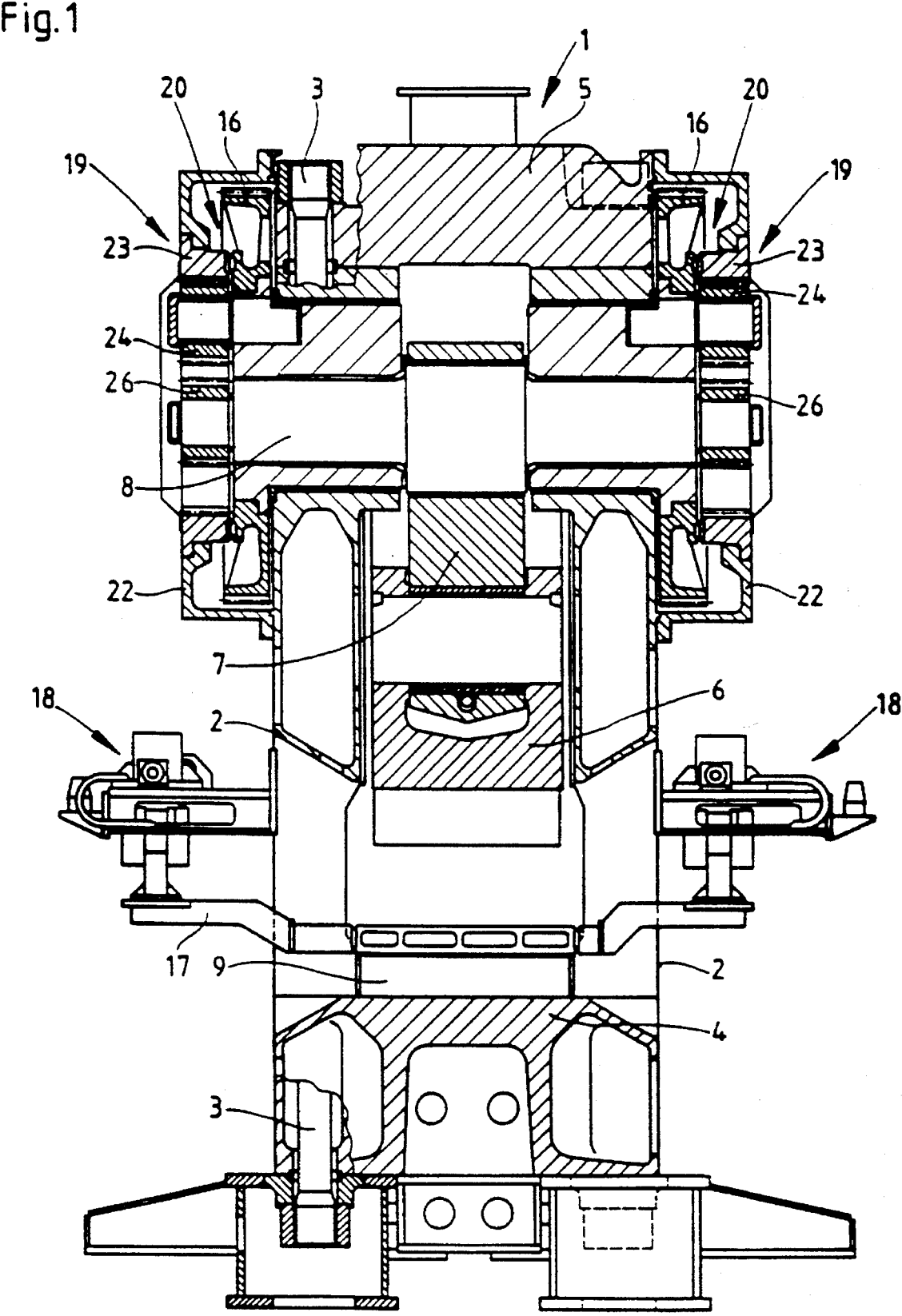
FIG. 1 shows an eccentric forging press having an irregular drive according to the invention, illustrated in longitudinal section and without the main drive.

An eccentric press 1 has a press body 2 which has the construction of a frame. Four tie rods 3 compress the press bed 4, the two side posts and the crosshead 5 to form a closed frame. The tool carriage 6 is moved up and down in known manner by way of a connecting rod 7 by a driven eccentric shaft 8, the tool carriage 6 cooperating with a lower die 9. An electric motor 11 drives, by way of a V belt 12, a flywheel 14 arranged on a back gear shaft 13, and the drive output is transmitted by way of a back gear pinion 15 to a large toothed wheel 16 mounted on both sides on the main axle (compare FIGS. 2 and 3). For the automatic step-wise transporting of workpieces there serve walking beams 17 of an automated walking beam system 18, the walking beams running laterally and vertically with respect to the lower die 9. In order to achieve even running and, in the case of hot forging, in order to transport the workpieces or forged pieces from one die to the next in continuous operation of the eccentric press 1 by means of the walking beams 17, the eccentric shaft 8 is provided on its two ends with the same irregular drives 19, which are constructed as planet gear systems 20 (compare FIGS. 4a and 4c).

Figure 2:
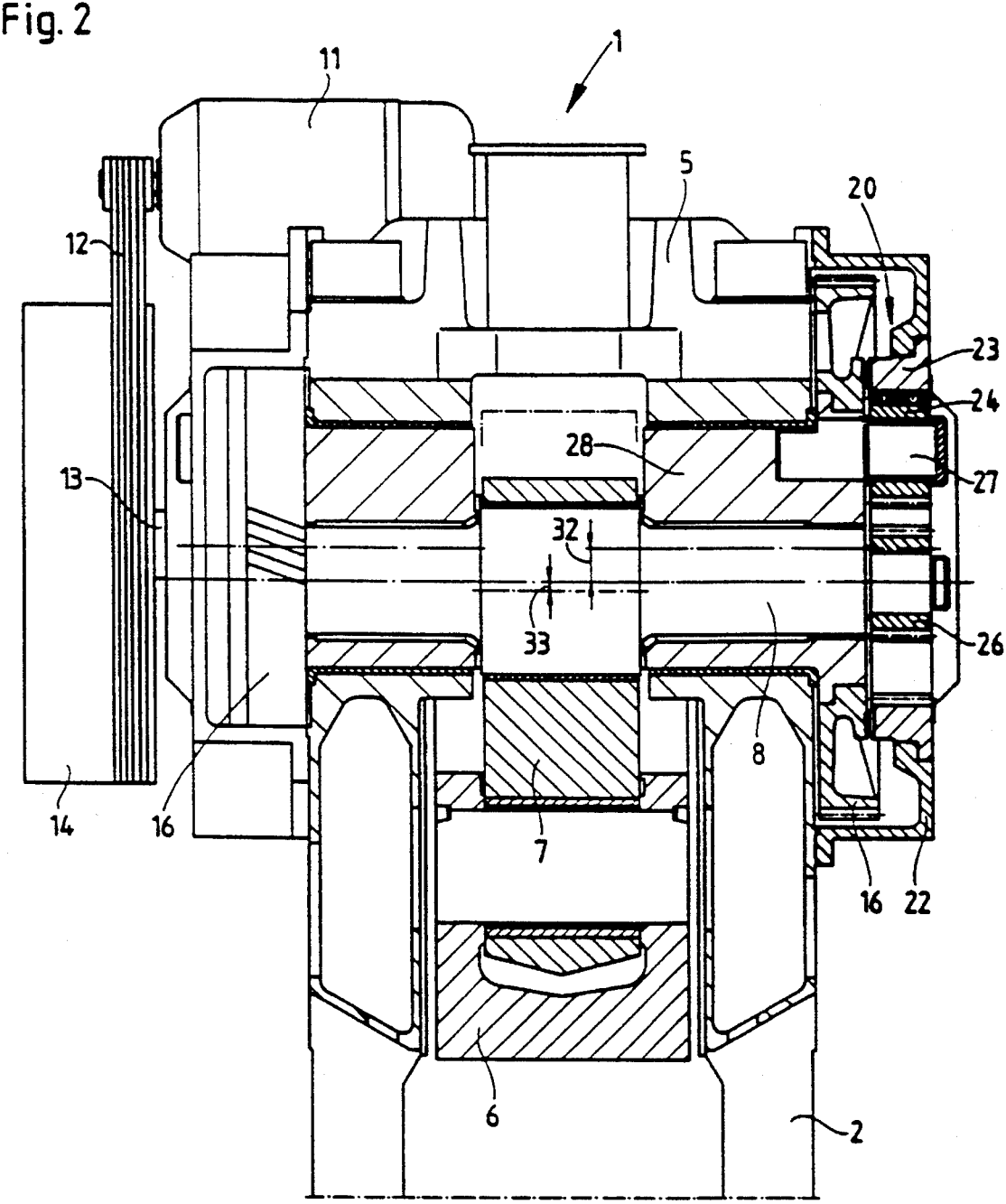
FIG. 2 shows, as a detail, the crown of the press according to FIG. 1, illustrated in partial section.
Figure 3:
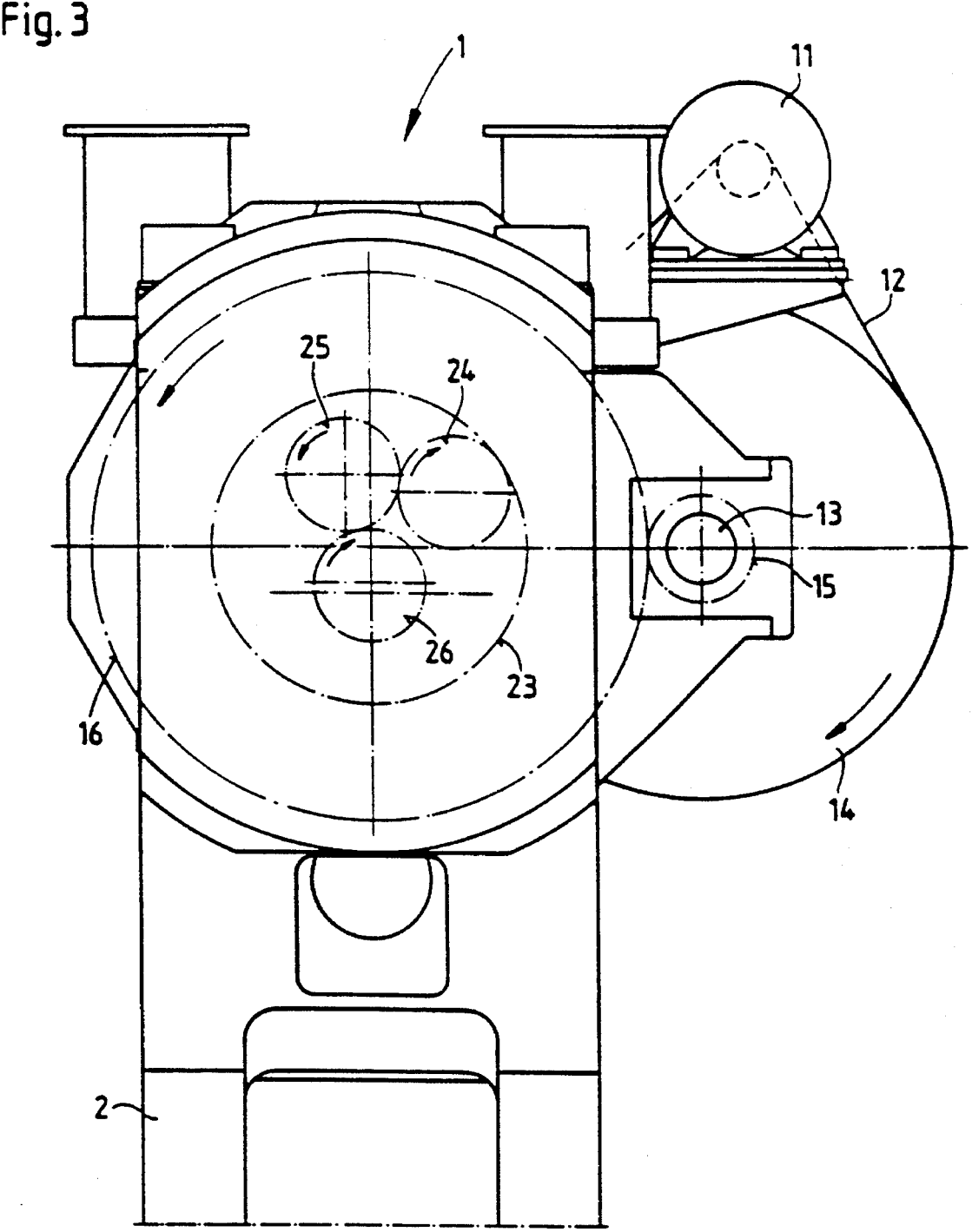
FIG. 3 shows the side view of the crown according to FIG. 2.

As can be seen in detail from FIGS. 2 and 3 as well as 4c, the planet gear system 20 comprises an internally toothed hollow gear 23 which is fixedly connected by way of a housing cover 22 to the press body 2. Arranged in the hollow gear 23 is a planet pinion gear 24 which meshes with the toothing thereof and is in geared connection by way of an intermediate gear 25 with a pinion 26 mounted on the eccentric shaft 8. Both the planet pinion gear 24 and the intermediate gear 25 are secured to a bearing axle 27; the bearing axles 27 are arranged in an eccentric sleeve 28 on which the large toothed wheel 16 is also mounted.

In operation of the eccentric press 1, the electric motor 11 transmits its driving output by way of the V belt 12, the flywheel 14 and the back gear pinion 15 to the large toothed wheel 16, with the result that a rotary motion is imposed on the eccentric sleeve 28 and thus on the eccentric shaft 8, this rotary motion being convened by way of the connecting rod 7 into an up-and-down movement of the tool carriage 6. Because of the transmission ratio achieved by the planet gear system 20, the eccentric shaft 8 turns three times as fast as the eccentric sleeve 28, and a curve 29 of a triangular movement sequence, as illustrated in FIG. 4b, is produced whereof the tip points downwards towards the bottom reversal point. The curve 29 of triangular movement sequence which is achieved results at the top reversal point, in accordance with the substantially horizontal base edge 31 of the triangular curve, in a rest position of the stroke, during which the tool carriage 6 does not move for a relatively long time although the eccentric shaft 8 continues to turn, and with only half the speed of the main drive (motor 11, flywheel 14, back gear pinion 15 and large toothed wheel 16) there is a forming speed which is just as fast at the bottom reversal point as is otherwise the case with cold forging in a fully automatic eccentric forging press operating in continuous operation (compare also the graph in FIG. 4d).

The triangular form of the curve 29 of movement sequence can be varied with the ratio of the large eccentric 32 to the small eccentric 33, with a faster forming speed being produced the more acute the downward tapering of the triangular curve. Since the eccentric press 1 can thus operate in continuous operation even in the case of hot forging, the coupling and deceleration unit (not illustrated), which is arranged on the back gear shaft 13, is only required on switching the eccentric press 1 on and off, as a result of which smooth running can be achieved and switching noise avoided; correspondingly, the wear and the energy consumption at the coupling and deceleration unit are reduced.

In another embodiment of a gear system 21, which brings about a rest position of the stroke of the tool carriage 6 at the top reversal point, illustrated in FIGS. 5a and 5c, the pinion 26 which is mounted on the eccentric shaft meshes with a stationary pinion 34 on the housing.

The gear system 21 brings about, in accordance with FIG. 5b, a curve 35 of a movement sequence which is substantially circular but is cut in in the form of a notch in the region of the top reversal point. The cutting in 36 in the form of a notch of the curve 35 of the movement sequence results in the tool carriage 6 being kept for an adequate period in a rest position which allows the eccentric press 1, despite the continuous operation, to maintain the cycle time required for the automated walking beam system 18 but still to operate at the bottom reversal point at the high forming speed required with hot forging (compare the graph in FIG. 5d).

I claim:

1. Automatic forming machine for hot forging workpieces which are conveyed stepwise through a forging region, said automatic forming machine comprising:

an eccentric shaft having an eccentric sleeve mounted thereto;

a tool carriage which is reciprocatably movable;

a connecting rod mounted on said eccentric shaft and connected to the tool carriage;

an irregular drive for driving said eccentric shaft so as to produce a hypocycloidal curve, said irregular drive having a pinion mounted on the eccentric shaft, a planet pinion gear, an intermediate gear, and a stationary, internally toothed hollow gear meshing with the planet pinion gear, said planet pinion gear being in geared connection by way of the intermediate gear with the pinion mounted on the eccentric shaft, wherein said planet pinion gear and the intermediate gear are mounted on bearing axles arranged on said eccentric sleeve and provided with a large toothed wheel at either end, said eccentric shaft being driven indirectly via the large toothed wheel at a driving end and the eccentric sleeve.

2. The automatic forming machine of claim 1, wherein said irregular drive is arranged so that the eccentric shaft rotates three times as fast as a stroke rate of said tool carriage.

* * * * *